Feb. 18, 1969

H. G. KAUFFMAN ET AL
COMPRESSOR VALVE 3,428,081

Filed Dec. 8, 1966

INVENTORS
HARRY G. KAUFFMAN
HALLET D. JONES
BY
Arthur Frederick
ATTORNEY

Feb. 18, 1969  H. G. KAUFFMAN ET AL  3,428,081
COMPRESSOR VALVE

Filed Dec. 8, 1966

INVENTORS
HARRY G. KAUFFMAN
HALLET D. JONES
BY
*Arthur Frederick*
ATTORNEY

United States Patent Office 3,428,081
Patented Feb. 18, 1969

3,428,081
COMPRESSOR VALVE
Harry G. Kauffman, 515 W. Main St., and Hallet D. Jones, 702 Clayton Ave., both of Waynesboro, Pa. 17268
Filed Dec. 8, 1966, Ser. No. 600,254
U.S. Cl. 137—516.21
Int. Cl. F16k 15/02
10 Claims

ABSTRACT OF THE DISCLOSURE

Apparatus for controlling the flow of fluid in a reciprocating compressor by means of a slidable valve member which is movable from seated to unseated positions to permit flow of fluid in one direction and movable to a seated position to prevent flow of fluid in a reverse direction.

---

This invention relates to valves and more particularly to a valve for controlling flow of gaseous fluid into the compression chamber of a reciprocating type compressor.

Present suction valves for reciprocating compressors, particularly the type located in a piston head, are relatively complex and hence expensive to fabricate and install. For example, the valve components require many critical machining steps to achieve the desired contour, and proper interfitting relationship of the parts. Furthermore, assembly is relatively complex, requiring numerous rivets and/or screws to secure the valve components together and other means for securing the valve in place. In addition, valves of conventional construction have a relatively small total fluid flow area in relation to their size so that valves of large size are required to provide the amount of fluid flow required for maximum efficiency of the compressor.

In view of the foregoing, it is one of the objects of the present invention to provide a compressor valve of relatively simple construction which is easy and relatively inexpensive to fabricate and assemble.

Another object of this invention is to provide a compressor valve capable of being simultaneously connected together into a unitary structure and secured in place.

A further object of the present invention is to provide a compressor valve having a greater fluid flow area therethrough than conventional valves of comparable size.

Accordingly, this invention contemplates a novel compressor valve for a reciprocative type compressor comprising a valve body exposed on one side to gaseous fluid in the compression chamber of the compressor and the opposite side to the suction pressure of the gaseous fluid to be compressed. The valve body has a recess in its side which is exposed to gaseous fluid in the compression chamber and a first passageway means extending from the side thereof exposed to suction pressure to the bottom of the recess. A valve seat member having conduit means is disposed within the recess in fluid tight manner so that the conduit means is in communication with the first passageway means in the valve body. A valve means is provided adjacent the valve seat member so as to seat on the latter and thereby prevent flow of fluid from the conduit means. To guide and limit the valve means in movement to and from a seated and unseated position, a cage is disposed adjacent the valve seat member. The cage or guide and stop member has associated therewith a second passageway means which communicates the conduit means with the compression chamber when the valve means is in an unseated or open position. The valve body, valve seat member and cage are secured together in a unitary structure by a single securing means, for example, a self-locking screw.

The invention will be more fully understood from the foregoing description when considered in connection with the accompanying drawings, in which.

Figure 4:
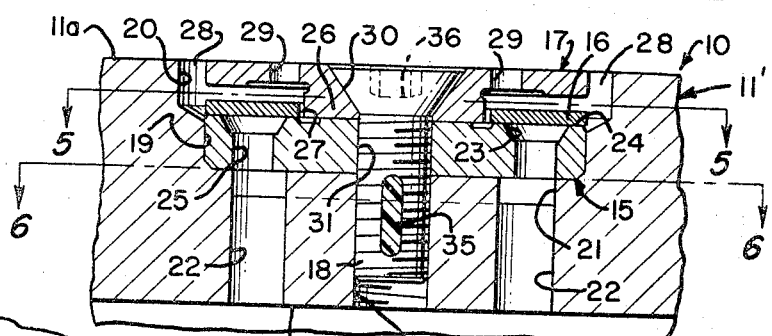
FIG. 4 is a sectional view taken substantially along line 4—4 of FIG. 3 looking in the direction of the arrows.
Figure 3:
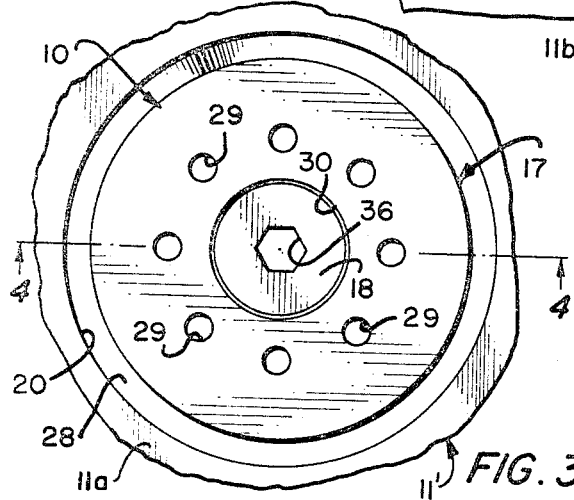
FIG. 3 is a fragmentary top plan view on an enlarged scale of the compressor valve according to this invention.
Figure 5:
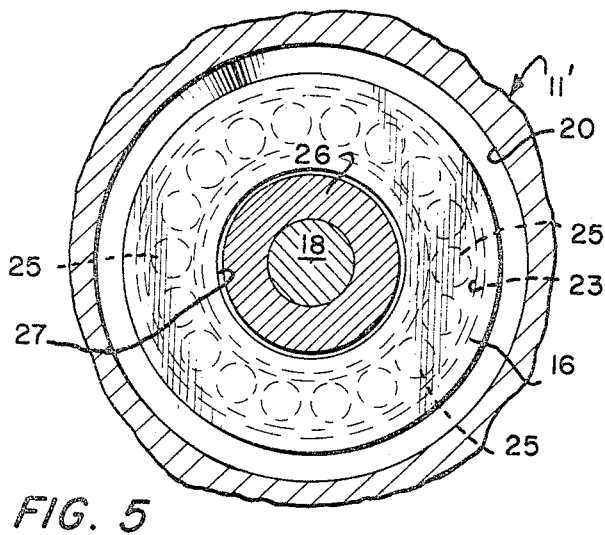
Figure 6:
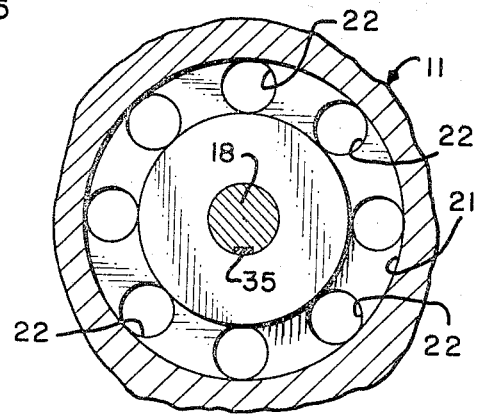
Figure 7:
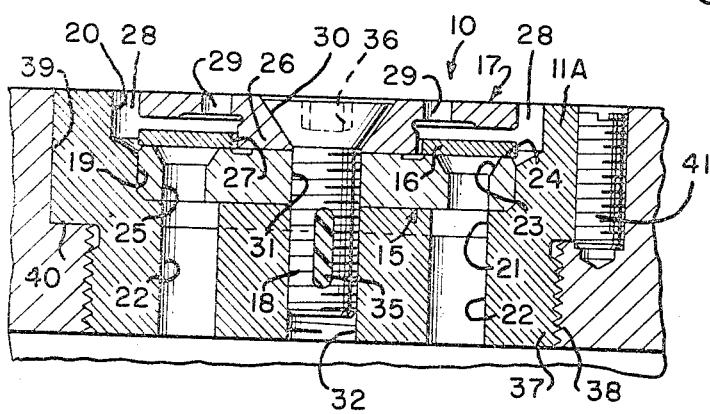

FIGS. 5 and 6 are transverse sectional views taken substantially along lines 5—5 and 6—6 of FIG. 4; and FIG. 7 is a view in cross section, similar to FIG. 4, of a modified compressor valve according to this invention.

Figure 1:
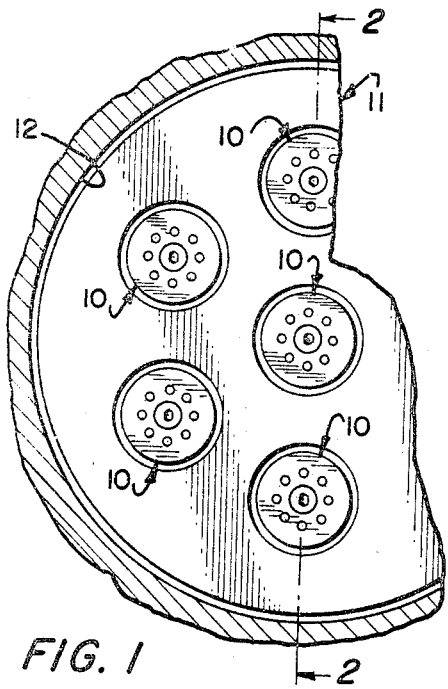
FIG. 1 is a fragmentary top plan view of a piston-cylinder assembly showing compressor suction valves embodying this invention.
Figure 2:
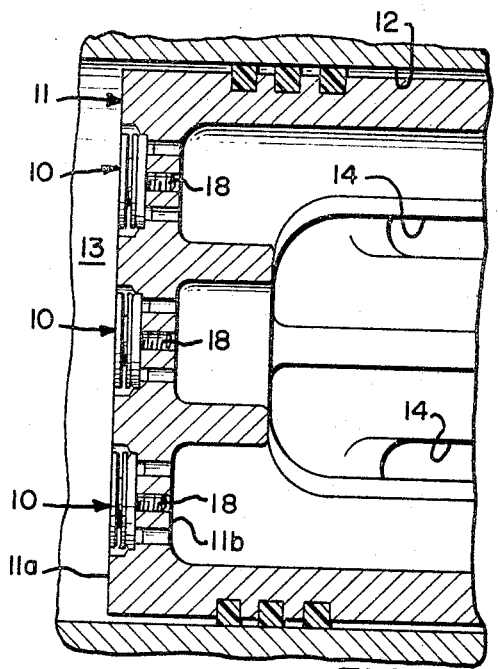
FIG. 2 is a fragmentary cross sectional view taken along line 2—2 of FIG. 1 with the valves shown in elevation.

Now referring to the drawings, and more specifically FIGS. 1 and 2, the reference number 10 generally designates compressor valves according to the present invention as applied to a compressor piston 11 so that the valve body is formed in the piston head. While a plurality of valves 10 are shown in the piston head, the invention is not limited thereto since one or more valves may be used in the piston head or be located elsewhere without departing from the spirit and scope of this invention. The piston 11 is disposed to reciprocate in a cylinder 12 to compress gaseous fluid in a compression chamber 13 defined by piston 11, cylinder 12 and the cylinder head (not shown). In the reciprocating compressor design, which is shown herein solely for illustrative purposes, gaseous fluid to be compressed passes into compression chamber 13 through valves 10 and elongated suction ports 14 located in the skirt of the piston.

As best shown in FIGS. 3 to 6, inclusive, compressor valve 10 comprises four major components; namely, valve body 11', valve seat member 15, valve plates 16, and guide and stop member or cage 17, which are secured together in a unitary structure by a securing means, such as a self-locking screw 18.

Valve body 11 has a recess 19 formed therein extending inwardly from the surface 11a of the valve body adjacent to compression chamber 13 inwardly to a point short of the opposite surface 11b of the valve body. The recess is counterbored at 20, the purpose of which will be explained hereinafter. An annular groove 21 is formed in the bottom of recess 19 (see FIGS. 4 and 6) and a plurality of circumferentially spaced passageways or holes 22 are bored from surface 11b in valve body 11' to annular groove 21, thereby communicating groove 21 with suction ports 14.

Valve seat member 15 is preferably disc shaped and is of such configuration and dimensions as to snugly fit within recess 19 and in abutment against the bottom of the recess such as to provide a fluid tight joint between itself and the recess. The upper surface of valve seat member 15 is provided with an annular groove 23 and is machined to form a valve seat surface 24 which engages and supports valve plate 16 of flat, ring-shaped configuration. As best shown in FIGS. 4 and 5, valve seat member 15 is provided with conduit means in the form of plurality of circumferentially spaced holes 25, each of which communicate groove 21 with groove 23.

The cage 17 is constructed and arranged to have a centrally projecting portion or boss 26 which abuts the central portion of the upper surface of valve seat member 15 and fits within the central opening 27 of valve plate 16. The boss 26 functions to guide valve plate 16 in its movement to and from a closed or seated position. The peripheral dimension of cage 17 is smaller than the diametric dimension of counterbore 20 so that an annular passageway 28 is defined between the periphery of the cage and the counterbore 20. To increase the flow area downstream of valve plate 16, additional flow area may be provided by a plurality of circumferentially spaced holes 29 (see FIGS. 3 and 4) in cage 17.

To secure the valve components, valve body 11', valve seat member 15 and cage 17, into a unitary structure, screw 18 is passed into registered openings 30, 31 and 32 in cage 17, valve seat member 15 and valve body 11', respectively. Opening 32 in valve body 11' is threaded to receive the threaded shank of screw 18 while opening 30 in cage 17 is provided with a configuration complementary to the shape of the head of screw 18 so that, as screw 18 is turned in tapped opening 32, cage 17 is drawn into tight abutment against valve seat member 15 and the latter tightly against the bottom of recess 19. To avoid accidental disassembly of compressor valve 10, screw 18 is preferably of the self-locking type, such as the type which has a strip of synthetic plastic 35 commercially known by the trademark "Teflon" bonded to the threads. Turning of screw 18 may be facilitated by a wrench socket 36 formed in the head of screw 18.

In the compressor valve modification shown in FIG. 7 valve body 11' shown in the embodiment illustrated in FIGS. 1 to 5 inclusive, is a member separate from the valve supporting structure such as a compressor piston, which valve body or adapter 11A has a reduced diameter threaded portion 37 to engage the threaded portion 38 of a bore 39 in the valve supporting structure. Reduced diameter threaded portion forms a shoulder 40 which abuts a complementary shoulder in bore 39. The adapter 11A is secured in bore 39 by one or more screws 41 which are turned in threaded bores partly formed in the adapter valve body 11A and the valve supporting structure.

In operation of the compressor valve 10, valve plate 16 moves into and out of seating relationship with valve seat surface 24 in response to differential pressure across valve plate 16. In the application illustrated and described herein, when the piston is moving away from the cylinder head (not shown) and top dead center, the valve plate 16 is caused to move to an open or unseated position so that gaseous fluid to be compressed flows from suction ports 14, into and through holes 22, groove 21, holes 25, groove 23, and thence, through annular passageway 28 and holes 29 (if provided) into compression chamber 13. The valve plate 16 is limited in its movement to an open position by abutment against cage 17. When the piston moves into its compression stroke, valve plate 16 is forced to a seated or closed position so that communication between the suction ports 14 and the compression chamber 13 is terminated and the gaseous fluid is trapped in the compressor chamber and is thereby capable of being compressed. Since the compressor valve 10, according to this invention, has a large fluid flow area provided by annular passageway 28, a smaller or lesser number of valves are required for a given compressor capacity than where valves of conventional construction are employed.

It is believed readily apparent from the foregoing description that a novel compressor valve has been provided which is relatively simple and inexpensive to fabricate and is exceptionally easy to assemble. It is a valve which provides a greater fluid flow area therethrough than conventional valves of comparable size.

Although two embodiments of the invention have been illustrated and described in detail, it is to be expressly understood that the invention is not limited thereto. Various changes can be made in the arrangement of parts without departing from the spirit and scope of the invention, as the same will now be understood by those skilled in the art.

What is claimed is:
1. A compressor valve comprising
 (a) a valve body having one side exposed to gaseous fluid to be compressed and the other side exposed to gaseous fluid being compressed in a compression chamber,
 (b) a recess in the side of said valve body exposed to gaseous fluid being compressed,
 (c) first passageway means in said valve body extending from the side of the valve body exposed to gaseous fluid to be compressed to the bottom of said recess,
 (d) a valve seat member disposed in fluid tight relationship in the recess,
 (e) said valve seat member having a conduit means therein communicating with said first passageway means in the valve body,
 (f) valve means disposed to move to and from abutment against said valve seat member to open and close the conduit means in the valve seat member under the urging of the differential pressure across said valve means,
 (g) a cage disposed in abutment against said valve seat member to limit movement of said valve means in an open position and guide said valve means in its movement to an open and closed position,
 (h) said cage having associated therewith second passageway means for communicating the conduit means in said valve seat plate when the valve means is in an open position to pass fluid to be compressed into the compression chamber, and
 (i) means for securing said valve body, valve seat member and cage together in a unitary structure.
2. The apparatus of claim 1 wherein said securing means is a self-locking screw.
3. The apparatus of claim 1 wherein said valve means is a ring shaped plate.
4. The apparatus of claim 1 wherein said passageway means is defined by the cage being dimensioned so as to be spaced from the walls of the recess in the valve body.
5. The apparatus of claim 1 wherein said cage is dimensioned so as to be spaced from the peripheral walls of the recess in the valve body and thereby define with the recess walls an annular passageway.
6. The apparatus of claim 1 wherein said second passageway means is defined by the cage being dimensioned so as to be spaced from the valve body walls defining the recess and a plurality of spaced holes in the cage.
7. The apparatus of claim 1 wherein the first passageway means and the conduit means each comprise a plurality of circumferentially spaced holes.
8. The apparatus of claim 1 wherein said valve body comprises an adapter which is secured in a supporting structure.
9. The apparatus of claim 1 wherein said cage is substantially disc shaped with a central boss adapted to butt against the valve seat member.
10. The apparatus of claim 1 wherein said valve means has a flat, ring-shaped configuration and said cage is disc shaped with a central boss adapted to abut the valve seat plate and within said flat, ring-shaped valve means to guide the latter in its movement to and from a closed position.

References Cited

UNITED STATES PATENTS

| | | | |
|---|---|---|---|
| 1,235,338 | 7/1917 | Lemp | 137—516.21 |
| 3,177,893 | 4/1965 | King | 137—516.15 X |

NATHAN L. MINTZ, *Primary Examiner.*